United States Patent [19]

Nakajima

[11] 4,418,877
[45] Dec. 6, 1983

[54] FISHING REEL
[75] Inventor: Hideki Nakajima, Sakai, Japan
[73] Assignee: Shimano Industrial Company Limited, Osaka, Japan
[21] Appl. No.: 319,285
[22] Filed: Nov. 9, 1981
[30] Foreign Application Priority Data Nov. 15, 1980 [JP] Japan .......................... 55-163672[U]

[51] Int. Cl.³ ............................................ A01K 89/01
[52] U.S. Cl. .......................... 242/84.21 R; 242/118.41
[58] Field of Search ................. 242/84.21 R, 84.21 A, 242/84.2 R, 84.2 A, 84.2 F, 84.2 G, 84.2 H, 84.1 R, 118.4, 118.41, 118.5

[56] References Cited
U.S. PATENT DOCUMENTS

| 3,092,352 | 6/1963 | Ransom | 242/84.21 R |
| 3,105,650 | 10/1963 | Kuether | 242/84.2 R |
| 3,602,453 | 8/1971 | Holmes | 242/84.2 A |
| 4,163,528 | 8/1979 | Egasaki et al. | 242/84.21 R |

FOREIGN PATENT DOCUMENTS 22271 of 1909 United Kingdom .......... 242/84.2 R

*Primary Examiner*—Billy S. Taylor
*Attorney, Agent, or Firm*—Stevens, Davis, Miller & Mosher

[57] ABSTRACT

A fishing reel in which a fishing line can be wound on a spool through rotation of a rotary frame having a bail arm by operating a handle and the wound line can be drawn out of the spool for casting by turning over the bail arm, said spool having a first flange at a side with respect to the reel body, a cylindrical extension extending at the first flange toward the reel body, a third flange provided at the end of the cylindrical extension to thereby form a groove for receiving the fishing line, so that the fishing line, if backlash occurs during casting, can be prevented from falling between and being caught by the spool and the rotary frame.

5 Claims, 4 Drawing Figures

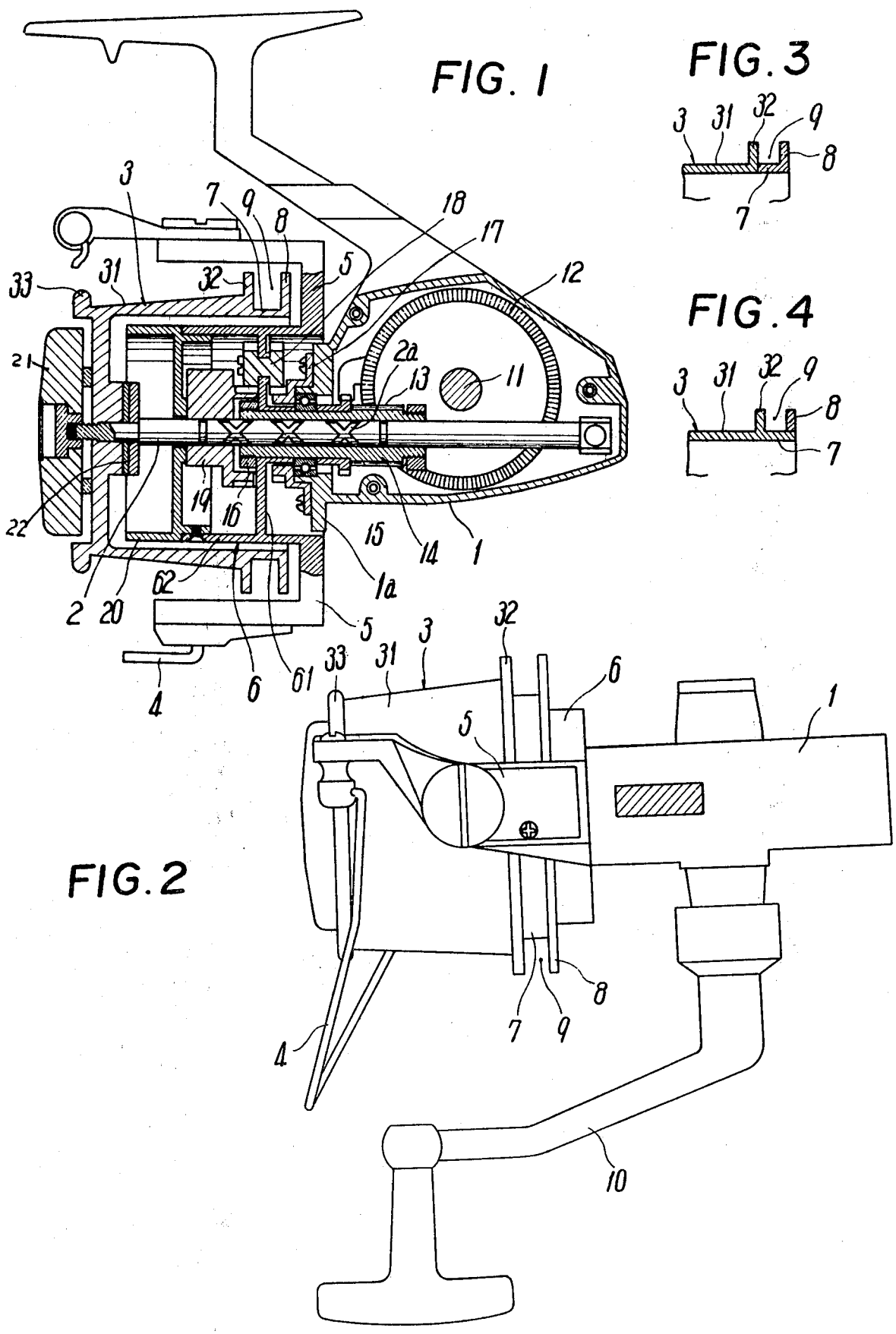

FISHING REEL

FIELD OF THE INVENTION

This invention relates to a fishing reel and more particularly to a fishing reel wherein a fishing line is wound onto a spool through rotation of a rotary frame having a bail arm which is turned over so that the wound line is drawn out of the spool for casting.

BACKGROUND OF THE INVENTION

Generally, the type of fishing reel described above is called a spinning type fishing reel which is well known. For casting according to this fishing reel, the fishing rod is swung down while a fisherman catches the fishing line drawn out of the spool with his fingers. During the swinging down of the fishing rod, the fishing line is released from the fingers to thereby be cast through a sinker provided at the end of the line. When the sinker alights on the water, the line is no longer in tension, and the line backlashes around the trunk of the spool. Hence, after casting when the line is excessively drawn out of the spool and is then wound on the spool by operating of the handle through turning over the bail arm to a fishing line wind-up position, the backlashing line falls between the rotary frame and the end of the spool at the side with respect to the reel body where it is caught by the rotary frame and the shaft supporting the rotary frame.

The above-said fishing reel generally comprises a spool which has a trunk and flanges provided at both axial sides of the trunk, the trunk having an outer diameter slightly larger than that of the spool shaft supporting the spool, the depth of a fishing line wind-up portion formed by the outer periphery of the trunk and the flanges being made deep. In addition, at the flange of the spool, at the side with respect to the reel body, a cylindrical skirt extends and has the same diameter as the outer diameter of the flange.

The above-noted line catching problem can be solved to some extent with the spool constructed as described above by decreasing the length of the wound line on the spool to thereby reduce the diameter of the bulk of the wound line at the fishing line wind-up portion in comparison with the diameter of the flange. However, the problem cannot be avoided when the length of the wound line is increased, and in such cases the problem occurs frequently. Moreover, even when the length of the wound line is reduced, the line riding on the skirt slides there and falls to the rotary frame and the shaft supporting the rotary frame.

Furthermore, with respect to the above-said fishing reel, it has been proposed that the trunk at the spool have a larger outer diameter to thereby provide a shallow depth of the fishing line wind-up portion of the spool, resulting in an increased casting distance. This type of fishing reel is mainly used in the games of fishing, wherein it is necessary to have the length of wound line on the spool the same as the length of the wound line on the aforesaid conventional type reel whose fishing line wind-up portion is made deep. Hence, the axial length of the trunk at the spool is made longer in comparison with that of the conventional type reel, making it difficult to provide the aforesaid skirt. Even if the skirt is provided, the axial length of the skirt cannot be made long, further aggravating instead of solving the aforesaid problem that the fishing line falls to the rotary frame.

SUMMARY OF THE INVENTION

The invention has been designed to overcome the noted problems. An object of the invention is to provide a fishing reel which is simple in construction and can securely prevent the fishing line from being caught by portions of the rotary frame and the like.

In other words, the invention is a spinning type fishing reel particularly so constructed that a spool comprises a trunk, a first flange placed on the trunk at the side with respect to a reel body and a second flange placed on the side of the fore end of the trunk, the spool having a cylindrical extension extending at the first flange toward the reel body, and at the end of the cylindrical extension a third flange is provided, so that an annular groove for receiving a fishing line can be formed by the first flange, third flange and outer periphery of the cylindrical extension.

Hence, if the wound line on the trunk of the spool backlashes and moves toward the reel body, the line can be caught by the annular groove. When the excessively drawn out line is wound after casting, the line can be securely prevented from falling to and being caught by the rotary frame or the shaft supporting the rotary frame.

Additionally, the invention can be applied to the fishing reels for the games of fishing wherein the trunk of the spool has a larger outer diameter and a fishing line wind-up portion is made shallow, resulting in a remarkable functional effect.

In the invention, it is preferable that the cylindrical extension is formed integrally with the spool. Alternatively, it can be formed separately from the spool and connected therewith. Also, the third flange at the cylindrical extension can be formed integrally therewith. Alternatively, it can be formed separately from the extension and connected therewith.

These and other objects of the invention will become more apparent in the detailed description and examples which follow.

BRIEF DESCRIPTION OF THE DRAWINGS

FIG. 1 is a longitudinal sectional view of an embodiment of a fishing reel of the invention, FIG. 2 is a partially cutaway plan view, and FIGS. 3 and 4 are sectional view of modified embodiments of the invention.

DETAILED DESCRIPTION OF THE INVENTION

The basic construction of the fishing reel shown in the attached drawings is conventional and so constructed that a reel body 1 is provided with a spool shaft 2 extending forward from a front wall 1a of the reel body, the spool shaft 2 supporting at the fore end a spool 3, a rotary frame 6 having a pair of supports 5, 5, which supports a bail arm 4, is rotatably supported between the spool 3 and the front wall 1a at the reel body 1, so that a fishing line caught by the bail arm 4 can be wound onto a trunk 31 of the spool 3 through rotation of the rotary frame 6.

The fishing reel shown in the drawings is for the games of fishing, to which the invention effectively can be applied, wherein the front wall 1a of the reel body 1 is made flat and right-angled with respect to the rotary axis of the rotary frame 6, the rotary frame 6 comprising a support wall 61 which has a parallel surface to the front wall 1a and a cylindrical member 62, the cylindrical member 62 being provided integrally with the support 5, 5 at the side with respect to the reel body, the trunk 31 of the spool 3 is made cylindrical and larger in the inner diameter than the outer diameter of the cylindrical member 62, and the trunk 31 is fitted onto the outer periphery of the cylindrical member 62.

In more detail, the trunk 31 is provided with a first flange 32 at the side with respect to the reel body and a second flange 33 at the side of the fore end. The outer diameters of these flanges 32, 33 are slightly larger than the outer diameter of the trunk 31, whereby the depth of the fishing line wind-up portion formed outside the trunk can be shallow. In addition, the axial length of the trunk is made long.

Furthermore, reference numeral 10 in FIG. 2 designates a handle supported to the reel body 1 wherein a transmission mechanism is housed for transmitting an operation of the handle 10 to the rotary frame 6.

The transmission mechanism comprises a handle shaft 11 rotating correspondingly to the handle 10, a master gear 12 supported to the handle shaft 11, and a tubular shaft 14 having a pinion gear 13 which engages with the master gear 12, the tubular shaft 14 being rotatably supported through a bearing 15 to the front wall 1a of the reel body 1, the front portion of the tubular shaft 14 projecting forward from the front wall 1a and supporting the support wall 61 of the rotary frame 6 through a nut 16.

In other words, the operation of the handle 10 is transmitted through the handle shaft 11, master gear 12 and pinion gear 13 to the tubular shaft 14 from which it is transmitted to the rotary frame 6.

In addition, the spool shaft 2 is inserted into the tubular shaft 14 along the longitudinal axis thereof so that the spool shaft can be supported to be axially movable. The spool shaft 2 has on the outer periphery at the axially intermediate portion thereof a traverse groove 2a formed spirally.

A gear cylinder 17 having at the periphery thereof teeth which define a sun gear is fixed to the front wall 1a of the reel body 1. An associating gear 18 is rotatably supported to the support wall 61 of the rotary frame 6, the associating gear having teeth engageable with the teeth of the gear cylinder 17. In addition, a guide member 19 is housed in the cylindrical member 62 of the rotary frame 6 to thereby be supported rotatably with respect to the spool shaft 2, the guide member having teeth engageable with the associating gear 18 and an engaging member (not shown) engageable with the traverse groove 2a.

Reference numeral 20 designates a pusher for the guide member 19, the pusher being fixed to the rotary frame 6.

Hence, when the rotary frame 6 rotates through rotation of the tubular shaft 14, the associating gear 18 rotates to thereby rotate the guide member 19 in an increased speed in comparison with rotation speed of the rotary frame 6, so that the spool shaft 2 can axially move in reciprocation.

Furthermore, reference numeral 21 in FIG. 1 designates a drag knob screwed on the spool shaft 2 and reference numeral 22 designates a frictional plate which restrains rotation of the spool 3 with respect to the spool shaft 2.

The fishing reel of the invention constructed as aforesaid is so designed that a cylindrical extension 7 is formed at the spool 3, which longitudinally extends from the first flange 32 toward the front wall 1a of the reel body 1, at the end of the cylindrical extension 7 a third flange 8 is provided and extends radially outwardly, so that an annular groove 9 for receiving a fishing line can be formed by the third flange 8, first flange 32 and the outer periphery of the cylindrical extension 7, the annular groove being placed adjacent to the trunk 31 through the first flange 32.

In the embodiment shown in FIG. 1, the cylindrical extension 7 and third flange 8 are formed integrally with the spool 3. The outer diameter of the cylindrical extension 7 is smaller than that of the trunk 31 at the spool 3, so that the depth of the annular groove 9 is deeper than that of the fishing line wind-up portion at the outer periphery of the trunk.

According to the above-said construction, when the wound line one the spool 3 is cast, a sinker and a rig at the end of the line alight on the water which untensions the line, resulting in a backlash of the line at the trunk 31 of the spool 3.

When the backlashing line at the trunk moves toward the reel body, the line falls in the annular groove 9 and is prevented from moving any more by the third flange 8 to thereby prevent the line from falling between the spool 3 and the rotary frame 6.

Hence, when the excessively drawn out line is wound on the spool 3 by the operation of the handle through turning over the bail arm 4 to a fishing line wind-up position, the fallen line can be securely prevented from being caught by the rotary frame 6 or a tubular shaft 14.

It is noted that is the line falls in the annular groove 9, and is caught thereby, it can be readily drawn out.

In the above-explained embodiment, the cylindrical extension 7 and the third flange 8 are formed integrally with the spool 3. In this instance, as shown in FIG. 3 the cylindrical extension 7 formed at the one end integrally with the third flange 8 is preferably formed separately from the spool 3, so that the extension 7 can be connected at the other end to the outer surface of the first flange 32 of the spool 3.

Additionally, as shown in FIG. 4 the extension 7 can be formed integrally with the spool 3 at the outer surface of the first flange 32, the third flange 8 in a ring-like shape can be formed separately from the spool 3 and be fitted at the end of the extension 7, so that the groove 9 can be formed among the third flange 8, first flange 32 and outer periphery of the extension 7.

As clearly understood from the aforesaid description, the fishing reel of the invention is so constructed that the cylindrical extension is provided at the first flange of the spool at the side with respect to the reel body, the third flange is provided at the end of the cylindrical extension to thereby form the annular groove, so that the fishing line can be securely prevented by the annular groove from falling between and being caught by the spool and the rotary frame. In addition, the fishing reel is simple in construction and inexpensive to produce and put into practical use.

While the embodiment of the invention has been shown and described, the invention is not limited to the specific construction thereof, which is merely exemplary.

It is to be understood that modifications and variations may be made to the invention without departing from the spirit and scope thereof, as those skilled in the art will readily understand.

Accordingly, the invention is not limited by the foregoing description, but only by the appended claims.

What is claimed is:

1. A fishing reel comprising:

a reel body having a handle;

a rotary frame comprising a cylindrical portion had having a bail arm and being rotatably supported to said reel body at the front thereof;

a transmission mechanism for transmitting an operation of said handle to said rotary frame; and a spool provided at the front of said rotary frame, said spool comprising a cylindrical trunk supported about the outer periphery of said cylindrical portion for winding thereon a fishing line, a first flange provided on one end of said trunk at a side closest to said reel body, a second flange provided on another end of said trunk at a side farthest removed from said reel body, a cylindrical extension extending from said first flange toward said reel body, and a third flange provided at one end of said cylindrical extension and extending radially outwardly, said first flange being located closer to said third flange than said second flange to define a wide fishing line winding portion on said trunk between said first and second flanges and a narrower annular groove for receiving a fishing line formed by said first flange, said third flange and the other periphery of said cylindrical extension, said annular groove receiving a fishing line which becomes displaced from said line winding portion during casting and moves toward said reel body to prevent said displaced line from being caught by said rotary frame.

2. A fishing reel according to claim 1, wherein said reel body is provided with a front wall having a flat surface which is right-angled with respect to a rotary axis of said rotary frame, said rotary frame further comprising a support wall which has a flat surface parallel to said front wall of said reel body.

3. A fishing reel according to claims 1 or 2, wherein said cylindrical extension is formed integrally with said spool.

4. A fishing reel according to claims 1 or 2, wherein said cylindrical extension is formed separately from said spool and connected is therewith.

5. A fishing reel according to claims 1 or 2, wherein said cylindrical extension has an outer diameter smaller than that of said trunk of said spool, the depth of said annular groove being deeper than that of said fishing line wind-up portion at the outer periphery of said trunk.

* * * * *